United States Patent [19]

Kato

[11] 4,275,477

[45] Jun. 30, 1981

[54] VEHICLE WINDOW GLASS WASHING SYSTEM

[75] Inventor: Yoshiaki Kato, Fujisawa, Japan

[73] Assignee: Nissan Motor Company, Limited, Yokohama, Japan

[21] Appl. No.: 100,127

[22] Filed: Dec. 4, 1979

[30] Foreign Application Priority Data

Dec. 14, 1978 [JP] Japan ............................. 53-172506

[51] Int. Cl.³ ............................................. B60S 1/48
[52] U.S. Cl. ................................... 15/250.02; 318/443
[58] Field of Search ............ 15/250.01, 250.02, 250.12, 15/250.17; 318/443, 483, DIG. 2

[56] References Cited

U.S. PATENT DOCUMENTS

| | | | |
|---|---|---|---|
| 3,562,839 | 2/1971 | Riester | 15/250.02 |
| 3,919,613 | 11/1975 | Steinmann | 15/250.02 X |

FOREIGN PATENT DOCUMENTS

| | | | |
|---|---|---|---|
| 1555169 | 10/1970 | Fed. Rep. of Germany | 15/250.02 |
| 1236398 | 6/1971 | United Kingdom | 15/250.02 |

Primary Examiner—Peter Feldman

[57] ABSTRACT

A vehicle window glass washing system is disclosed which comprises swingable wiper means provided in sliding contact with the window glass of a vehicle and injector means for injecting liquid detergent onto a position of the window glass when actuated. The system also comprises a rotary disc rotatable in synchronism with swinging movement of the wiper means. A pair of contact plates are disposed on the rotary disc symmetrically with respect to the center of the rotary disc and electrically connected to each other. A pair of contacts are fixed to the rotary disc symmetrically with respect to the center of the rotary disc so that the rotary disc can bring one of the contact plates into contact with one of the fixed contacts while at the same time the other contact plate into contact with the other fixed contact to allow actuation of the injector means except when the wiper means is around the position at which the liquid detergent is injected.

3 Claims, 4 Drawing Figures

VEHICLE WINDOW GLASS WASHING SYSTEM

BACKGROUND OF THE INVENTION

1. Field of the Invention

This invention relates to a window glass washing system including at least one swingable wiper for washing a vehicle window glass with liquid detergent injected on the window glass. The invention is more particularly concerned with such a system capable of injecting liquid detergent intermittently in synchronism with swinging movement of the wiper so as to prevent the injected liquid detergent from striking on the wiper.

2. Description of the Prior Art

A window glass washing system is normally incorporated in a vehicle such as an automotive vehicle for washing its front or rear window glass. Such a system includes at least one wiper swingable in sliding contact with the window glass for washing it with a liquid detergent injected thereon. If liquid detergent is continuously injected on the window glass during swinging movement of the wiper, however, it will strike on the wiper and scatter over a wide area of the window glass, which results in detergent economy penalty.

In order to prevent the injected liquid detergent from striking on the wiper, an improved window glass washing system has been proposed which is adapted to inject liquid detergent intermittently in synchronism with swinging movement of the wiper so as to stop the injection of liquid detergent when the wiper swings up or down around the position of the window glass at which the liquid detergent is injected. However, such a conventional system is insufficient in durability.

SUMMARY OF THE INVENTION

It is therefore one object of the present invention to provide an improved vehicle window glass washing system which is high in detergent economy and durability.

According to the present invention, this and other objects are accomplished by a vehicle window glass washing system comprising at least one swingable wiper means provided in sliding contact with the window glass, at least one injector means for injecting liquid detergent onto a position of the window glass when actuated, a rotary disc rotatable in synchronism with swinging movement of the wiper means, a pair of contact plates disposed on the rotary disc symmetrically with respect to the center of the rotary disc, a pair of contacts fixed to face the rotary disc, the contact plates electrically connected to each other, and the fixed contacts are disposed symmetrically with respect to the center of the rotary disc, whereby the rotary disc can bring one of the contact plates into contact with one of the fixed contacts while at the same time the other contact plate into contact with the other fixed contact to allow actuation of the injector means except when the wiper means is around the position.

Other objects, means, and advantages of the present invention will become apparent to one skilled in the art thereof from the following description.

DESCRIPTION OF THE PREFERRED EMBODIMENT

Prior to the description of the preferred embodiment of the present invention, reference will be made to a prior art vehicle window glass washing system in order to specifically point out the difficulties attendant thereon.

Figure 1:
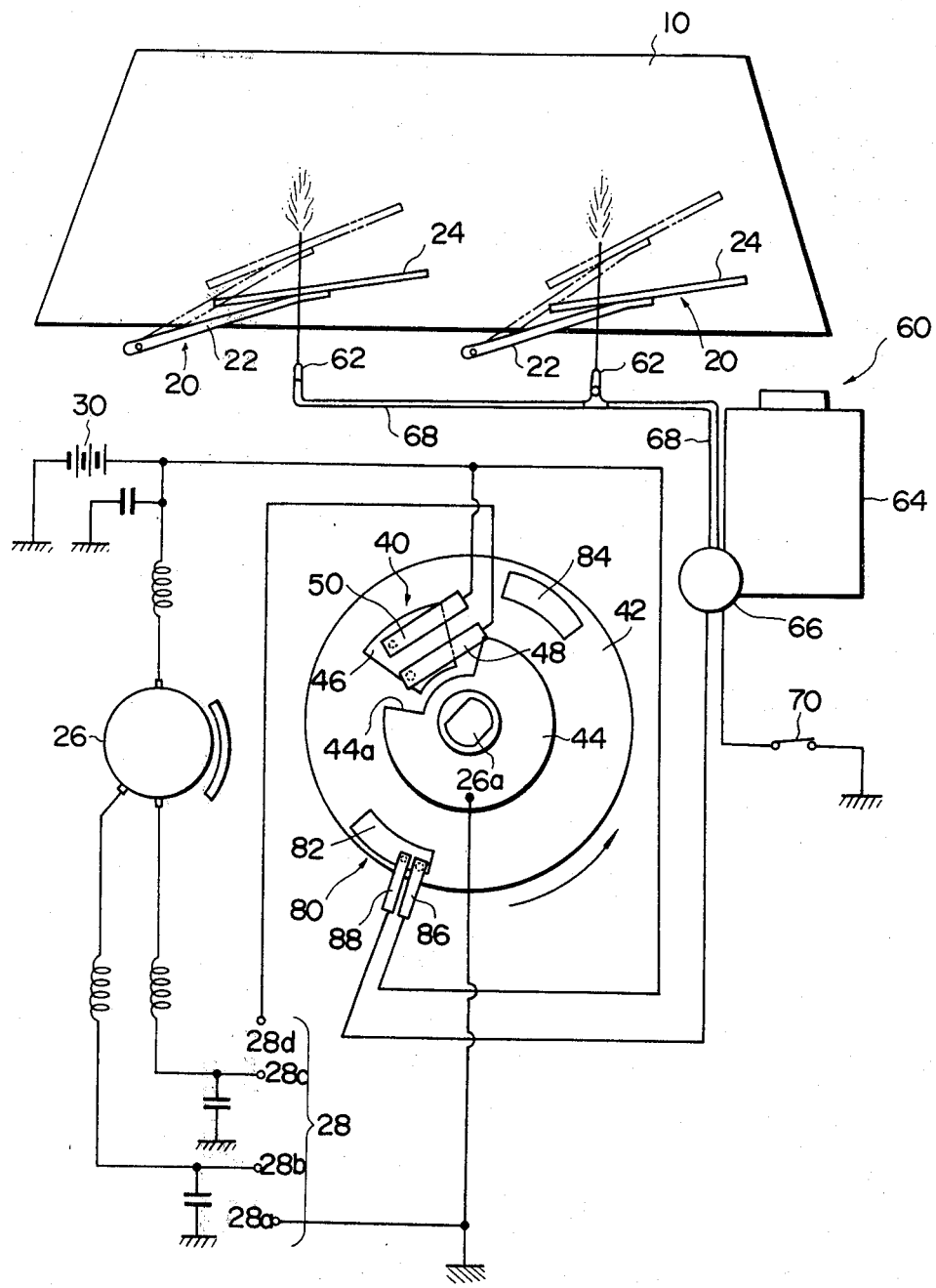
FIG. 1 is a schematic view showing a conventional vehicle window glass washing system.

Referring to FIG. 1, there is illustrated a conventional vehicle window glass washing system which is adapted to inject liquid detergent onto a vehicle window glass 10 intermittently in synchronism with swinging movement of its wiper so as to stop the injection of liquid detergent when the wiper swings up or down around the position of the window glass 10 at which the liquid detergent is injected. The system comprises a wiper unit 20 including a pair of wiper arms 22 each having at its free end a wiper blade 24 rotatably secured thereto in sliding contact with the window glass 10. The wiper unit 20 includes a wiper motor 26 connected through a wiper switch 28 to a DC power source 30 for swinging the wiper arms 22 to cause reciprocal sliding movement of the respective wiper blades 24 with respect to the window glass 10.

The system also comprises a first switching mechanism 40 which includes a rotary disc 42 secured on the gear shaft 26a of the wiper motor 26 for rotation in synchronism with rotation of the wiper motor 26. The rotary disc 42 has on its surface a contact plate 44 disposed centrally thereon and formed with a cutout 44a. A contact plate 46 is disposed on the rotary disc 42 to face the cutout 44a of the contact plate 44. A pair of contacts 48 and 50 are fixed on the inner surface of a drive motor gear cover (not shown) such that both of the contact plates 44 and 46 can come into sliding contact with the fixed contact 48 and only the contact plate 46 can come into sliding contact with the fixed contact 50 as the rotary disc 42 rotates. The contact plate 46 is disposed in such a position as to come into sliding contact with the fixed contacts 48 and 50 when the wiper arms 22 are at their rest positions.

The wiper switch 28 has terminals 28a to 28d, the terminal 28a connected to ground, the terminal 28b connected to one negative terminal of the drive motor 26, the terminal 28c connected to the other negative terminal of the drive motor 26, and the terminal 28d connected to the fixed contact 48. The contact 50 is connected to the positive terminal of the DC power source 30 which is connected to the positive terminal of the drive motor 26.

The drive motor 26 rotates at a high speed when the wiper switch 28 is operated to make a connection between the terminals 28a and 28b and it rotates at a low speed when the wiper switch 28 is operated to make a connection between the terminals 28a and 28c. When the wiper switch 28 is turned off, the terminals 28c and 28d are connected to permit rotation of the drive motor 26 at a low speed until the wiper arms 22 swing to their reset positions. When the wiper arms 22 swing to their rest positions, the contact plate 46 comes into contact with both of the fixed contacts 48 and 50 to equalize the potentials at the positive and negative terminals of the drive motor 26 so as to automatically bring it to a stop.

An injector unit 60 is provided which includes a pair of detergent injection nozzles 62 disposed in front of the window glass 10, a detergent tank 64 containing therein a liquid detergent, an injector pump 66 for delivering liquid detergent from the tank 64 through a conduit 68 to the injection nozzles 62 to inject it on the window glass 10. The injector pump 66 has its one terminal connected to ground through a switch 70 which is drivingly associated with the wiper switch 28. The other terminal of the injector pump 66 is connected to the positive terminal of the DC power source 30 through a second switch mechanism 80.

The second switch mechanism 80 comprises a pair of contact plates 82 and 84 disposed on the rotary disc 42 symmetrically with respect to the center of the rotary disc 42 and extending a length in circumferential spaced relationship outside the contact plate 46. The second switch mechanism 80 also comprises a pair of contacts 86 and 88 fixed to the drive motor gear cover (not shown). The fixed contact 86 is connected to the positive terminal of the DC power source 30 and the fixed contact 88 is electrically connected to one terminal of the injector pump 66, the other terminal of which is connected through the switch 70 to ground. The fixed contacts 86 and 88 are juxtaposed in small circumferential spaced relationship such that either of the contact plates 82 and 84 can come into sliding contact with both of the fixed contacts 86 and 88 as the rotary disc 42 rotates. The contact plates 82 and 84 and the fixed contacts 86 and 88 are arranged such that the contact plate 82 comes into sliding contact with the fixed contacts 86 and 88 when the contact plate 46 comes into sliding contact with the fixed contacts 48 and 50; that is, the drive motor 26 is stopped as shown in FIG. 1. The length of the contact plates 82 and 84 is suitably selected such that either of the contact plates 82 and 84 comes out of contact with the fixed contacts 86 and 88 when the wiper blades 24 swing up or down around the position of the window glass 10 at which the liquid detergent is injected.

When the wiper switch 28 is turned on, the injector switch 70 is also turned on and the injector pump 66 starts delivering liquid detergent from the tank 64 to the injection nozzles 62 to inject it on the window glass 10 since the contacts 86 and 88 are electrically connected by the contact plate 82 to couple power to the injector pump 66 at this time. If the wiper switch 28 is operated to cause rotation of the wiper motor 26 at a low or high speed to swing the wiper unit 20, the rotary disc 42 rotates to bring the contact plate 82 out of contact with the contacts 86 and 88 when the wiper blades 24 come around the positions of the window glass 10 at which the liquid detergent is injected. As a result, power is disconnected from the injector pump 66 to stop the rotation of the injector pump 66 and thus injection of the liquid detergent.

When the rotary disc 42 further rotates half a turn with rotation of the wiper motor 26; that is, the wiper arms 22 start their return swinging movement, the contact plate 84 comes into sliding contact with the fixed contacts 86 and 88 to allow application of power from the DC power source 30 to the injector pump 66 to cause the injector pump 66 to start delivering liquid detergent from the tank 64 to the injection nozzles 62 and injecting it therethrough on the window glass 10 again. This continues until the rotary disc 42 further rotates to bring the contact plate 84 out of contact with the fixed contacts 86 and 88 when the wiper blades 24 swing around the positions of the window glass 10 at which the liquid detergent is injected. The above operation is repeated so that liquid detergent can be injected on the window glass 10 intermittently so as to prevent the injected liquid detergent from striking on the wiper. This can avoid detergent economy penalty and assure high visibility through the window glass 10.

In such a conventional arrangement, however, the fixed contacts 86 and 88 of the second switching mechanism 80, elongated normally to the direction of rotation of the rotary disc 42, are subject to twisting forces with rotation of the rotary disc 42. Thus, the fixed contacts 86 and 88 would be subject to failure or breakdown after a number of uses.

Figure 2:
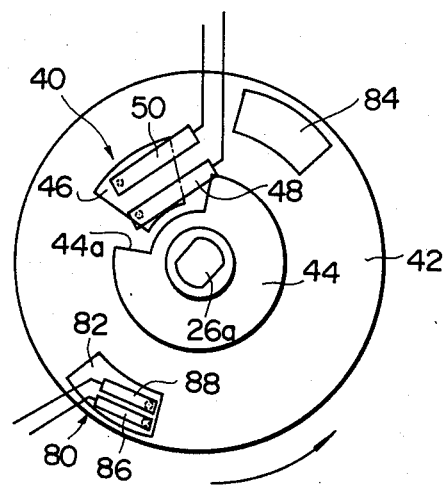
FIG. 2 is a schematic view showing a modified form of the switching mechanism of the system of FIG. 1.

FIG. 2 illustrates a modified form of the fixed contacts 86 and 88 which are juxtaposed to extend in the direction of rotation of the rotary disc 42 in order to prevent any twisting force form exerting on them. However, such a modification requires for the contact plates 82 and 84 to have an increased width to ensure positive contact of the fixed contacts 86 and 88 with either of the contact plates 82 and 84. Although this requires for the rotary disc 42 to have an increased diameter, the diameter of the rotary disc 42 is limited to such an extent that the rotary disc 42 can be contained in the wiper motor gear cover and cannot be increased without changing the design of the wiper motor 26.

Figure 3:
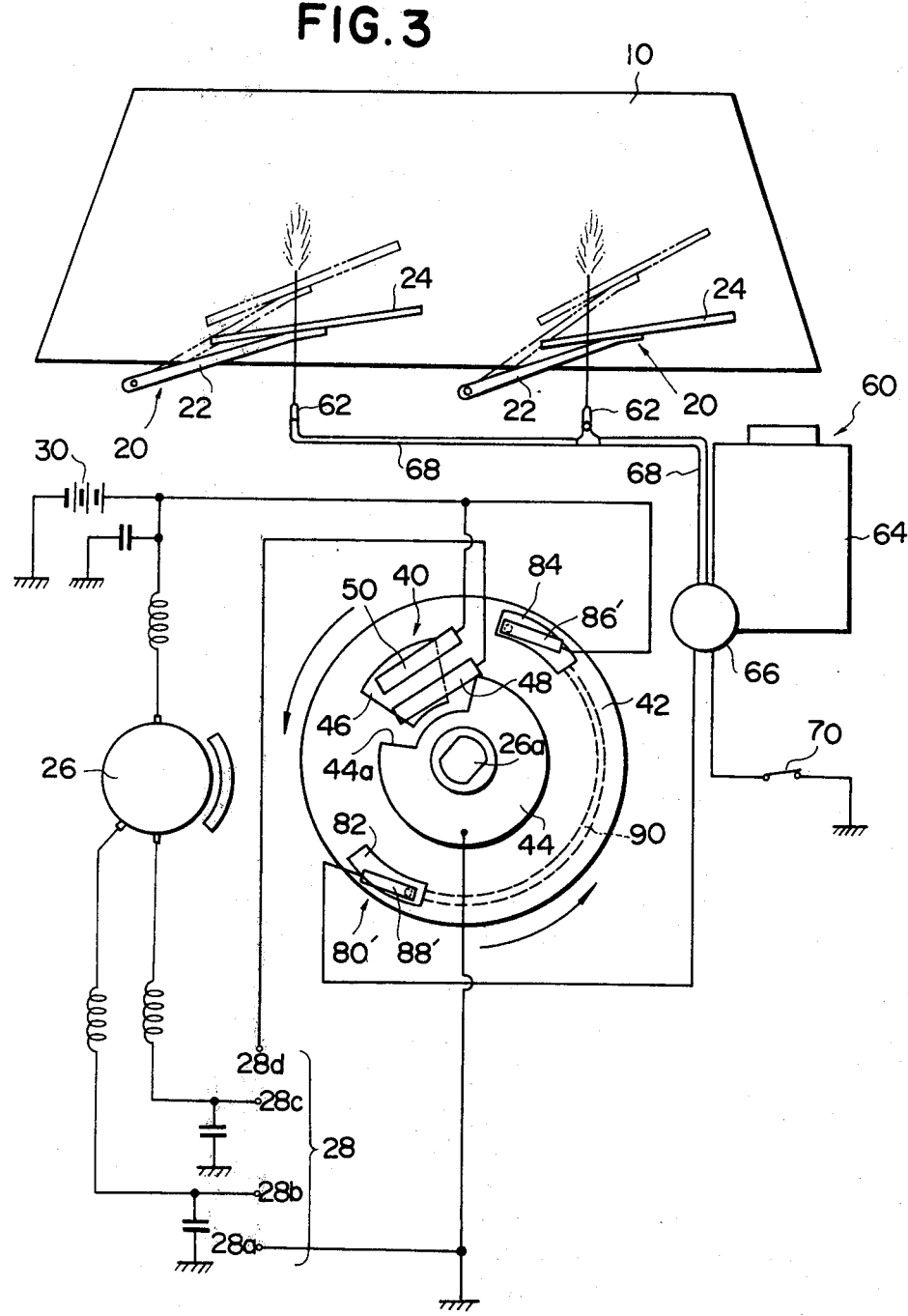
FIG. 3 is a schematic view showing one embodiment of a vehicle window glass washing system made in accordance with the present invention.

Referring to FIG. 3, there is illustrated one embodiment of a vehicle window glass washing system made in accordance with the present invention. Parts in FIG. 3 which are like those in FIG. 1 have been given the same reference character. Parts which perform the same function but are different in form have been given the same reference character with a prime suffix.

In this embodiment, the contact plates 82 and 84 of the second switch mechanism 80', which are disposed on the rotary disc 42 symmetrically with respect to the center of the rotary disc 42 and extending a length in circumferential spaced relationship outside the contact plate 46, are electrically connected to each other such as by a conductive plate 90 provided on the rear surface of the rotary disc 42. The second switch mechanism 80' comprises a pair of contacts 86' and 88' fixed to the wiper motor gear cover (not shown) symmetrically with respect to the center of the rotary disc 42 so that one of the contact plates 82 and 84 can comes into sliding contact with one of the contacts 86' and 88', while at the same time the other contact plate can come into sliding contact with the other contact thereby electrically connecting the contacts 86' and 88' to each other as the rotary disc 42 rotates.

The contacts 86' and 88' are elongated in the direction of rotation of the rotary disc 42. The contact plates 82 and 84 and the fixed contacts 86' and 88' are arranged such that one of the contact plates 82 and 84 comes into sliding contact with one of the fixed contacts 86' and 88' while at the same time the other contact plate comes into sliding contact with the other contact so as to electrically connect the fixed contacts 86' and 88' when the contact plate 46 comes into sliding contact with the fixed contacts 48 and 50 of the first switch mechanism 40.

In operation, if the wiper unit 20 and the injector unit 60 are simultaneously actuated, the rotary disc 42 brings the contact plate 82 out of contact with the fixed contact 88' and the contact plate 84 out of contact with the fixed contact 86' so as to stop the application of power to the injector pump 66 and injection of the liquid detergent through the injection nozzles 62 when the wiper blades 24 swing up around the positions of the window glass 10 at which the liquid detergent is injected. When the wiper blades 24 begin their return swinging movement, the rotary disc 42 brings the contact plate 84 into sliding contact with the fixed contact 88' and at the same time the contact plate 82 into the sliding contact with the fixed contact 86' to allow application of power from the DC power source 30 to the injector pump 66 so that the injector pump 66 can start delivering liquid detergent from the tank 64 to the injection nozzles 62 and injecting it therethrough onto the window glass 10. When the wiper blades 24 swing down around the positions of the window glass 10 at which the liquid detergent is injected, the rotary disc 42 brings the contact plate 82 out of contact with the fixed contact 86' and the contact plate 84 out of contact with the fixed contact 88' to stop the application of power to the injector pump 66 and injection of the liquid detergent onto the window glass 10. The above operation is repeated so that liquid detergent can be injected onto the window glass 10 intermittently so as to prevent the injected liquid detergent from striking on the wiper blades.

Figure 4:
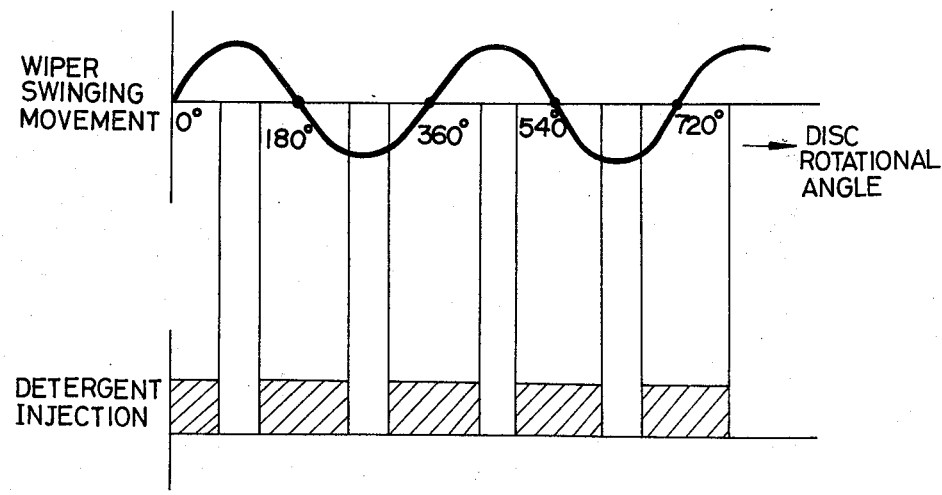
FIG. 4 is a diagram showing the time of occurrence of detergent injection with respect to swinging movement of the wiper.

FIG. 4 is a diagram showing the time of occurrence of detergent injection with respect to swinging movement of the wiper arms. In FIG. 4, the hatched areas represent the periods during which liquid detergent is injected on the window glass 10.

There has been provided, in accordance with the present invention, an improved vehicle window glass washing system which is high in detergent economy and durability and small in size. It is to be understood that the scope of the invention is not to be restricted to the embodiment above described but rather, in view of the numerous modifications and changes which will readily occur to those skilled in the art, the scope of the invention is set forth in the appended claims.

What is claimed is:

1. A system for washing a vehicle window glass, comprising: at least one swingable wiper means provided in sliding contact with said window glass, at least one injector means for injecting liquid detergent onto a position of said window glass when actuated, a rotary disc rotatable in synchronism with swinging movement of said wiper means, a pair of contact plates disposed on said rotary disc symmetrically with respect to the center of said rotary disc, a pair of contacts fixed to face said rotary disc, said contact plates electrically connected to each other, and said fixed contacts disposed symmetrically with respect to the center of said rotary disc, whereby said rotary disc can bring one of said contact plates into contact with one of said fixed contacts while at the same time the other contact plate into contact with the other fixed contact to allow actuation of said injector means except when said wiper means is around said position.

2. A system according to claim 1, wherein each of said fixed contacts is elongated in the direction of rotation of said rotary disc.

3. A system according to claim 1, wherein said contact plates are electrically connected to each other through a conductive plate provided on the rear surface of said rotary disc.

* * * * *